United States Patent
Kagata et al.

(10) Patent No.: US 9,873,814 B2
(45) Date of Patent: Jan. 23, 2018

(54) INK COMPOSITION

(71) Applicants: Seiko Epson Corporation, Tokyo (JP); Mitsui Chemicals, Inc., Tokyo (JP)

(72) Inventors: Takayoshi Kagata, Shiojiri (JP); Toshihiro Yoshimura, Ichihara (JP); Yasuyuki Kagawa, Ichihara (JP); Yukiko Egami, Koto-ku (JP); Hiroshi Maekawa, Ichihara (JP); Hiroko Wachi, Chiba (JP); Tsuyoshi Sano, Shiojiri (JP); Akira Mizutani, Shiojiri (JP); Atsushi Denda, Chino (JP)

(73) Assignees: Seiko Epson Corporation (JP); Mitsui Chemicals Inc. (JP)

( * ) Notice: Subject to any disclaimer, the term of this patent is extended or adjusted under 35 U.S.C. 154(b) by 92 days.

(21) Appl. No.: 15/008,854

(22) Filed: Jan. 28, 2016

(65) Prior Publication Data

US 2016/0222244 A1  Aug. 4, 2016

(30) Foreign Application Priority Data

Jan. 29, 2015 (JP) ................. 2015-015454
Jan. 29, 2015 (JP) ................. 2015-015455

(51) Int. Cl.
C09D 11/106 (2014.01)
C09D 11/322 (2014.01)
C09D 133/08 (2006.01)
C09D 11/107 (2014.01)

(52) U.S. Cl.
CPC .......... *C09D 133/08* (2013.01); *C09D 11/107* (2013.01); *C09D 11/322* (2013.01)

(58) Field of Classification Search
USPC .............................................. 523/160
See application file for complete search history.

(56) References Cited

U.S. PATENT DOCUMENTS

| | | | |
|---|---|---|---|
| 4,880,465 A | 11/1989 | Loria et al. | |
| 2006/0275606 A1 | 12/2006 | Mizutani | |
| 2007/0191509 A1 | 8/2007 | Kobayashi | |
| 2011/0200751 A1* | 8/2011 | Yatake | B41J 3/4078 427/261 |
| 2012/0079960 A1* | 4/2012 | Okuda | C09D 11/10 106/31.65 |

(Continued)

FOREIGN PATENT DOCUMENTS

| | | |
|---|---|---|
| JP | 2006-274214 A | 10/2006 |
| JP | 2007-211176 A | 8/2007 |
| JP | 2012-233148 A | 11/2012 |

OTHER PUBLICATIONS

EVA Product Data page from Polysciences.com, downloaded Jun. 22, 2017.*

(Continued)

*Primary Examiner* — Vu A Nguyen
(74) *Attorney, Agent, or Firm* — Harness, Dickey & Pierce, P.L.C.

(57) ABSTRACT

An ink composition includes a white coloring material, polymer particles, and a solvent, the polymer particles satisfying the relationship represented by the following expression (1).

$$Y \leq 0.33X + 20 \quad (1)$$

where X is an average particle size D50 (nm) and Y is a melting start temperature (° C.).

9 Claims, 3 Drawing Sheets

(56) References Cited

U.S. PATENT DOCUMENTS

2013/0202858 A1* 8/2013 Shimohara ............ C09D 11/30
428/195.1

OTHER PUBLICATIONS

Perrier et al., Macromolecules 2005, 38, 2033-2036).*
Product Data for NanoTek® Slurry from C.I. Kasei Co., Ltd., downloaded Jun. 22, 2017.*
Product Information for Sumikaflex S-410HQ from Sumika Chemtex Co., Ltd., downloaded Jun. 22, 2017.*

* cited by examiner

INK COMPOSITION

Japanese Patent Application No. 2015-015454 filed on Jan. 29, 2015, and Japanese Patent Application No. 2015-015455 filed on Jan. 29, 2015, are hereby incorporated by reference in their entirety.

BACKGROUND OF THE INVENTION

The present invention relates to an ink composition.

A color image is formed on a recording medium using color inks (e.g., cyan ink, magenta ink, yellow ink, and black ink). In recent years, an ink that can form an image having a color that cannot be obtained using only the color inks has attracted attention. For example, a white ink composition that includes a white coloring material such as titanium dioxide has attracted attention. The white ink composition can form a white image that cannot be obtained using the color inks.

For example, when recording a color image on a recording medium that may have a color other than white (e.g., plastic product or metal product), the white ink composition may be used to cancel out the color of the recording medium in order to improve the color development capability of the color image. When recording a color image on a transparent sheet, the white ink composition may be used to form a white shield layer that reduces the transparency of the color image. Therefore, the white ink composition is required to exhibit an improved white color development capability when the white ink composition is caused to adhere to the recording medium.

The white color development capability when the white ink composition is caused to adhere to the recording medium has been improved by increasing the concentration of the white coloring material included in the white ink composition, or increasing the particle size of the white coloring material. However, the rub fastness of the white image formed using the white ink composition may be impaired when the concentration of the white coloring material is increased. On the other hand, when the particle size of the white coloring material is increased, the white coloring material may precipitate in the ink composition. Specifically, an improvement in white color development capability has a trade-off relationship with the occurrence of precipitation or deterioration in rub fastness. For example, JP-A-2007-211176, JP-A-2006-274214, and JP-A-2012-233148 disclose a method that utilizes porous titanium dioxide particles as the white coloring material in view of the above problem.

When porous titanium dioxide particles are used as the white coloring material, the occurrence of precipitation may be reduced. However, since the use of porous titanium dioxide particles cannot sufficiently improve the shield capability and the color development capability of the recorded white image, a further improvement in white color development capability has been desired.

SUMMARY

Several aspects of the invention may solve at least some of the above problems, and provide an ink composition that can improve the shield capability and the color development capability of a white image that is formed by causing the ink composition to adhere to a recording medium. Several aspects of the invention may provide an ink composition that can also reduce the occurrence of precipitation of a white coloring material in the ink composition with the passing of time.

According to one aspect of the invention, there is provided an ink composition including a white coloring material, polymer particles, and a solvent, the polymer particles satisfying the relationship represented by the following expression (1), $$Y \leq 0.33X + 20 \qquad (1)$$

where X is an average particle size D50 (nm) and Y is a melting start temperature (° C.).

DETAILED DESCRIPTION OF THE EMBODIMENT

The invention was conceived in order to solve at least some of the above problems, and may be implemented as described below (see the following application examples).

Application Example 1

According to one embodiment of the invention, an ink composition includes a white coloring material, polymer particles, and a solvent,
the polymer particles satisfying the relationship represented by the following expression (1), $$Y \leq 0.33X + 20 \qquad (1)$$

where X is an average particle size D50 (nm) and Y is a melting start temperature (° C.).

The white ink composition according to Application Example 1 can improve the shield capability and the color development capability of a white image that is formed by causing the ink composition to adhere to a recording medium. It is considered that this effect is achieved through the following mechanism. Specifically, the polymer particles form a number of voids between the white coloring materials when the ink composition is caused to adhere to the recording medium, and form a layer (void layer) that includes the voids when the polymer particles form a film. It is considered that the scattering of light increases due to the void layer, so that the white color development capability is improved.

Application Example 2

In the ink composition according to Application Example 1, the polymer particles may include a repeating unit derived from an unsaturated vinyl monomer.

Application Example 3

In the ink composition according to Application Example 2, the polymer particles may further include a repeating unit derived from a monomer that includes two or more polymerizable double bonds.

Application Example 4

In the ink composition according to Application Example 3, the polymer particles may include the repeating unit derived from the monomer that includes two or more polymerizable double bonds in a ratio of 1 to 10 parts by mass based on 100 parts by mass of the polymer particles.

Application Example 5

In the ink composition according to Application Example 1, the polymer particles may have a solubility in toluene of 10 to 80 mass %.

Application Example 6

In the ink composition according to Application Example 1, the polymer particles may have been obtained by polymerization in the presence of a chain transfer agent.

Application Example 7

In the ink composition according to Application Example 1, the average particle size D50 of the polymer particles may be 50 to 500 nm.

Application Example 8

The ink composition according to Application Example 1 may have an absorbance of 1.1 to 2.2 when the ink composition is diluted with water so that the solid content of the white coloring material is 0.01 mass %.

Application Example 9

In the ink composition according to Application Example 1, the average particle size D50 of the white coloring material and the average particle size D50 of the polymer particles may satisfy the relationship "D1:D2=1:0.01 to 1:5", where D1 (nm) is the average particle size D50 of the white coloring material, and D2 (nm) is the average particle size D50 of the polymer particles.

Application Example 10

In the ink composition according to Application Example 9, D1 may be 100 to 800 nm, and D2 may be 100 to 500 nm.

Application Example 11

In the ink composition according to Application Example 1, the content of the white coloring material and the content of the polymer particles may satisfy the relationship "W1:W2=1:5 to 5:1", where W1 is the content of the white coloring material, and W2 is the content of the polymer particles.

Application Example 12

In the ink composition according to Application Example 1, the white coloring material may be aggregates of particles having a primary particle size of 10 to 200 nm.

Exemplary embodiments of the invention are described in detail below. Note that the invention is not limited to the following exemplary embodiments. It is intended that the invention includes various modifications that can be practiced without departing from the scope of the invention.

1. Ink Composition

An ink composition according to one embodiment of the invention includes a white coloring material, polymer particles, and a solvent as essential components. Each component included in the ink composition according to one embodiment of the invention is described in detail below.

1.1. White Coloring Material

The white coloring material used in connection with one embodiment of the invention is not particularly limited as long as the white coloring material is a pigment that is used for a normal white ink.

The term "white ink" used herein refers to an ink that can record a color that is commonly referred to as "white", and includes a white ink that is slightly colored. The term "white ink" used herein also includes an ink that includes the pigment and is referred to as "white ink", or sold under the name of "white ink". The term "white ink" used herein also includes an ink of which the brightness ($L^*$) and the chromaticity ($a^*$, $b^*$) satisfy $70 \leq L^* \leq 100$, $-4.5 \leq a^* \leq 2$, and $-6 \leq b^* \leq 2.5$ when the ink is printed (recorded) on Epson photo paper (luster) (manufactured by Seiko Epson Corporation) at a duty of 100% or more or in an amount sufficient to cover the surface of the photo paper (measured using a spectrophotometer ("Spectrolino" manufactured by Gretag-Macbeth), D50 light source, observation field of view: 2°, density: DIN NB, white reference: Abs, filter: No, measurement mode: Reflectance).

Examples of the white coloring material used in connection with one embodiment of the invention include a metal oxide, barium sulfate, calcium carbonate, and the like. Examples of the metal oxide include titanium dioxide, zinc oxide, silica, alumina, magnesium oxide, and the like. The white coloring material may be particles having a hollow structure. The particles having a hollow structure are not particularly limited. Known particles having a hollow structure may be used as the white coloring material. For example, the particles disclosed in U.S. Pat. No. 4,880,465 may preferably be used as the particles having a hollow structure. Among these, titanium dioxide is preferable as the white coloring material used in connection with one embodiment of the invention from the viewpoint of the degree of whiteness and rub fastness.

It is preferable that the white coloring material used in connection with one embodiment of the invention be secondary particles formed by the aggregation of primary particles having an average primary particle size of 10 to 200 nm. A number of pores (voids) are formed in the surface of secondary particles formed by the aggregation of primary particles. Such secondary particles may be hereinafter referred to as "porous particles". When the porous particles are used as the white coloring material, since a dispersion medium can enter the voids of the porous particles, the porous particles (white coloring material) exhibit excellent dispersion stability in the ink composition. Since the specific gravity of the porous particles is smaller than that of a white coloring material that has the same particle size as that of the porous particles and does not have a number of pores formed in the surface thereof, the porous particles rarely precipitate in the ink composition.

The content (on a solid basis) of the white coloring material in the ink composition according to one embodiment of the invention is preferably 1 to 20 mass %, and more preferably 5 to 15 mass %. When the content of the white coloring material is within the above range, it is possible to form an image that exhibits an excellent white color development capability, and reduce the occurrence of a situation in which the nozzle of an inkjet recording device is clogged, for example.

The average particle size D50 (average secondary particle size) of the white coloring material is preferably 100 to 800 nm, more preferably 150 to 600 nm, and particularly preferably 200 to 400 nm. When the average particle size D50 of the white coloring material is within the above range, it is possible to reduce the occurrence of a situation in which the dispersion stability of the particles is impaired due to precipitation or the like, or the nozzle of an inkjet recording device is clogged, for example. When the average particle size D50 of the white coloring material is within the above range, there is a tendency that it is possible to form an image that exhibits an excellent white color development capability.

The average particle size D50 of the white coloring material may be measured using a particle size distribution analyzer that utilizes a dynamic light scattering method as the measurement principle. Examples of such a particle size distribution analyzer include Microtrac UPA (manufactured by Nikkiso Co., Ltd.).

The absorbance (wavelength: 500 nm) of the ink composition according to one embodiment of the invention when the ink composition is diluted with water so that the solid content of the white coloring material is 0.01 mass % is preferably 1.1 to 2.2, and more preferably 1.4 to 1.8. When the absorbance is within the above range, it is possible to form an image that exhibits an excellent white color development capability, and reduce the occurrence of a situation in which the nozzle of an inkjet recording device is clogged, for example.

An example of a method for producing the white coloring material used in connection with one embodiment of the invention is described below. A method for producing porous titanium dioxide particles is described below as an example of the method for producing the white coloring material.

The white coloring material used in connection with one embodiment of the invention may be produced by a method that includes a first step that mixes titanium dioxide particles with a compound that includes phosphorus to obtain a mixture, a second step that mixes the mixture with a solution that includes an acidic metal salt that includes at least one element selected from zirconium, cerium, zinc, scandium, yttrium, hafnium, magnesium, and barium, and a third step that subjects the resulting mixture to either or both of drying and calcining to obtain the white coloring material. Each step is sequentially described below.

First Step

In the first step, the titanium dioxide particles are mixed with the compound that includes phosphorus to obtain a mixture. The compound that includes phosphorus is preferably a phosphoric acid compound, and more preferably a condensed phosphate. Note that only one type of compound that includes phosphorus may be used, or two or more types of compounds that include phosphorus may be used in combination.

The term "condensed phosphate" used herein refers to an acid salt obtained by the dehydration-condensation of orthophosphoric acid ($H_3PO_4$). Various condensed phosphates may be used. Examples of the condensed phosphate include alkali metal salts of pyrophosphoric acid, tripolyphosphoric acid, tetrapolyphosphoric acid, trimetaphosphoric acid, tetrametaphosphoric acid, hexametaphosphoric acid, and the like. Specific examples of the condensed phosphate include, but are not limited to, sodium pyrophosphate, potassium tripolyphosphate, sodium hexametaphosphate, and the like. Note that various other condensed phosphates may also be used. It is preferable to use a salt of pyrophosphoric acid, polyphosphoric acid, or hexametaphosphoric acid (more preferably sodium hexametaphosphate). Note that these condensed phosphates may be used in combination.

It is preferable to perform the first step using a wet method (i.e., perform the first step in the presence of a solvent such as water). For example, the titanium dioxide particles and the compound that includes phosphorus are mixed in an aqueous medium with stirring. Examples of the aqueous medium include water and/or a solvent that dissolves water partially in an arbitrary ratio, or dissolves water completely. The water is not particularly limited. Distilled water, ion-exchanged water, tap water, industrial water, or the like may be used. It is preferable to use distilled water or ion-exchanged water.

The solvent that dissolves water partially in an arbitrary ratio, or dissolves water completely, is not particularly limited as long as the solvent is an organic solvent that exhibits affinity to water. Examples of the solvent include methanol, ethanol, propyl alcohol, isopropyl alcohol, acetone, acetonitrile, dimethyl sulfoxide, dimethylformamide, dimethylimidazolidinone, ethylene glycol, tetraethylene glycol, dimethylacetamide, N-methyl-2-pyrrolidone, tetrahydrofuran, dioxane, methyl ethyl ketone, cyclohexanone, cyclopentanone, 2-methoxyethanol (methyl cellosolve), 2-ethoxyethanol (ethyl cellosolve), ethyl acetate, and the like. Among these, methanol, ethanol, propyl alcohol, isopropyl alcohol, acetonitrile, dimethyl sulfoxide, dimethylformamide, acetone, tetrahydrofuran, dioxane, diethylene glycol, diethyl ether, ethylene glycol, and polyglycerol are preferable due to high affinity to water.

The pH of the mixture is not particularly limited, but is preferably 0.5 to 13, and more preferably 2 to 11.

Second Step

In the second step, the mixture obtained by the first step is mixed with the solution that includes the acidic metal salt that includes at least one element selected from zirconium, cerium, zinc, scandium, yttrium, hafnium, magnesium, and barium. More specifically, the solution that includes the acidic metal salt that includes at least one element selected from zirconium, cerium, zinc, scandium, yttrium, hafnium, magnesium, and barium is mixed into the aqueous slurry solution that includes the titanium dioxide particles and the compound that includes phosphorus. After adjusting the pH of the mixture, the mixture is filtered to obtain a solid.

Examples of the acidic metal salt include a metal halide, a metal nitrate, a metal sulfate, and the like. The term "metal halide" used herein includes a metal oxyhalide.

Examples of the metal halide include a zirconium halide, a cerium halide, a zinc halide, a scandium halide, a yttrium halide, a hafnium halide, a magnesium halide, a barium halide, and hydrates thereof.

Examples of the metal nitrate include zirconium nitrate, cerium nitrate, zinc nitrate, scandium nitrate, yttrium nitrate, hafnium nitrate, magnesium nitrate, barium nitrate, and hydrates thereof.

Examples of the metal sulfate include zirconium sulfate, cerium sulfate, zinc sulfate, scandium sulfate, yttrium sulfate, hafnium sulfate, magnesium sulfate, barium sulfate, and hydrates thereof.

When the solution that includes the acidic metal salt that includes at least one element selected from zirconium, cerium, zinc, scandium, yttrium, hafnium, magnesium, and barium is mixed into the aqueous slurry solution that includes the titanium dioxide particles and the compound that includes phosphorus, the resulting mixture has a pH within a strongly acidic region. It is preferable to adjust the pH of the mixture to 2 to 7 by adding a base such as sodium hydroxide.

Third Step

In the third step, the solid obtained by the second step is subjected to either or both of drying and calcining to obtain the white coloring material. In one embodiment of the invention, the solid may be subjected to both drying and calcining, or may be subjected to either drying or calcining.

<Drying>

In one embodiment of the invention, the solid obtained by the second step may be dried to obtain the white coloring material. The drying (heating) temperature is preferably from room temperature to 300° C., and more preferably from room temperature to 200° C.

The white coloring material may be obtained by a method that heats the solid at a predetermined temperature to remove water or a solvent, and grinds or classifies the residue (solid), for example; a method that removes water or a solvent at a low temperature to room temperature, heats the residue at a predetermined temperature, and grinds or classifies the resulting solid (e.g., freeze-drying method or vacuum drying method); a method that adds a poor solvent such as methanol to the solid to effect aggregation, followed by filtration and drying; a method that sprays particles having a particle size of 10 micrometers or less using a spray dryer, and volatilizes the solvent to obtain a powder; or the like.

<Calcining>

The solid obtained by the second step, or the powder obtained by the drying step, may be calcined. The calcining temperature is preferably 300 to 1,000° C., more preferably 650° C. or less, and still more preferably 600° C. or less. The solid or the powder may be calcined at a constant temperature, or may be calcined while gradually increasing the temperature from room temperature. The calcining time may be determined taking account of the calcining temperature, but is preferably 1 to 24 hours. The solid or the powder may be calcined in air, or may be calcined in an inert gas (e.g., nitrogen or argon). The solid or the powder may be calcined under reduced pressure, or may be calcined under vacuum.

1.2. Polymer Particles

It is preferable that the polymer particles used in connection with one embodiment of the invention include a repeating unit derived from an unsaturated vinyl monomer. It is more preferable that the polymer particles used in connection with one embodiment of the invention further include a repeating unit derived from a monomer that includes two or more polymerizable double bonds in addition to the repeating unit derived from the unsaturated vinyl monomer from the viewpoint of improving ejection stability through the formation of a crosslinked polymer.

1.2.1. Repeating Unit Derived from Unsaturated Vinyl Monomer

Examples of the unsaturated vinyl monomer include an acrylate monomer, a methacrylate monomer, an aromatic vinyl monomer, a vinyl ester monomer, a vinyl cyanide compound monomer, a halogenated monomer, an olefin monomer, a diene monomer, a vinyl monomer, an unsaturated carboxylic acid, an acrylamide, a hydroxyl group-containing monomer, and the like (that are generally used for emulsion polymerization). Among these, an acrylate monomer, a methacrylate monomer, an aromatic vinyl monomer, a vinyl ester monomer, a vinyl cyanide compound monomer, an unsaturated carboxylic acid, an acrylamide, and a hydroxyl group-containing monomer are preferable.

Examples of the acrylate monomer include methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, and the like.

Examples of the methacrylate monomer include methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, and the like.

Examples of the aromatic vinyl monomer include styrene, p-methylstyrene, α-methylstyrene, 2-methylstyrene, vinyltoluene, t-butylstyrene, chlorostyrene, vinylxylene, vinylnaphthalene, vinylanthracene, vinylanisole, divinylbenzene, and the like.

Examples of the vinyl ester monomer include vinyl acetate and the like. Examples of the vinyl cyanide compound monomer include acrylonitrile, methacrylonitrile, and the like. Examples of the halogenated monomer include vinylidene chloride, vinyl chloride, and the like. Examples of the olefin monomer include ethylene, propylene, and the like. Examples of the diene monomer include butadiene, chloroprene, and the like. Examples of the vinyl monomer include vinyl ether, vinyl ketone, vinylpyrrolidone, and the like. Examples of the unsaturated carboxylic acid include acrylic acid, methacrylic acid, itaconic acid, fumaric acid, maleic acid, and the like. Examples of the acrylamide include acrylamide, methacrylamide, N,N'-dimethylacrylamide, and the like. Examples of the hydroxyl group-containing monomer include 2-hydroxyethyl acrylate, 2-hydroxypropyl acrylate, 2-hydroxyethyl methacrylate, 2-hydroxypropyl methacrylate, and the like.

These unsaturated vinyl monomers may be used either alone or in combination.

1.2.2. Repeating Unit Derived from Monomer that Includes Two or More Polymerizable Double Bonds Examples of the monomer that includes two or more polymerizable double bonds include a diacrylate compound, a triacrylate compound, a tetraacrylate compound, a hexaacrylate compound, a dimethacrylate compound, a trimethacrylate compound, divinylbenzene, methylenebisacrylamide compound, and the like. When a three-dimensionally crosslinked polymer obtained by copolymerizing a crosslinkable monomer that includes two or more (preferably three or more) polymerizable double bonds with the unsaturated vinyl monomer is used, the surface of the nozzle plate is rarely wetted with the ink composition, and it is possible to more reliably prevent the occurrence of curved flight, and further improve ejection stability.

Specific examples of the monomer that includes two or more polymerizable double bonds include a diacrylate compound such as polyethylene glycol diacrylate, triethylene glycol diacrylate, 1,3-butylene glycol diacrylate, 1,6-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, and 2,2'-bis(4-acryloxydiethoxyphenyl)propane; a triacrylate compound such as trimethylolpropane triacrylate, trimethylolethane triacrylate, and tetramethylolmethane triacrylate; a tetraacrylate compound such as ditrimethylol tetraacrylate, tetramethylolmethane tetraacrylate, and pentaerythritol tetraacrylate; a hexaacrylate compound such as dipentaerythritol hexaacrylate; a dimethacrylate compound such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxyphenyl)propane; a trimethacrylate compound such as trimethylolpropane trimethacrylate and trimethylolethane trimethacrylate; methylenebisacrylamide; and divinylbenzene.

These monomers that include two or more polymerizable double bonds may be used either alone or in combination.

The content of the repeating unit derived from the monomer that includes two or more polymerizable double bonds in the polymer particles is preferably 1 to 10 parts by mass, and more preferably 2 to 8 parts by mass, based on 100 parts by mass of the polymer particles, from the viewpoint of the melting start temperature.

1.2.3. Production of Polymer Particles

The polymer particles used in connection with one embodiment of the invention may be produced directly by a known emulsion polymerization method using the above monomer(s), or may be produced by finely dispersing a copolymer produced by another polymerization method in a liquid medium using a mechanical emulsification method.

Examples of the emulsion polymerization method include a method that polymerizes the monomer(s) at a time in the presence of a dispersant and an initiator, and a method that polymerizes the monomer(s) in the presence of a dispersant and an initiator while continuously supplying the monomer(s). The polymerization temperature is normally 30 to 90° C. The emulsion polymerization method normally produces polymer particles substantially in the form of an aqueous dispersion of copolymer particles (i.e., emulsion).

The aqueous dispersion of the copolymer particles obtained using the emulsion polymerization method is highly stable in the presence of a small amount of dispersant, and has an advantage in that copolymer particles having a very small particle size can be easily obtained.

Examples of the dispersant that is used when implementing the emulsion polymerization method include a nonionic surfactant, an anionic surfactant, a nonionic water-soluble polymer, an anionic water-soluble polymer, and the like. These dispersants may be used either alone or in combination.

Specific examples of the nonionic surfactant include a polyoxyethylene alkyl ether such as polyoxyethylene lauryl ether and polyoxyethylene stearyl ether, a polyoxyalkylene alkyl ether, a polyoxyethylene polyoxypropylene alkyl ether, polyoxyethylene styrenated phenyl ether, polyoxyethylene distyrenated phenyl ether, polyoxyethylene octyl phenyl ether, polyoxyethylene oleyl phenyl ether, polyoxyethylene nonyl phenyl ether, an oxyethylene-oxypropylene block copolymer, t-octylphenoxyethylpolyethoxyethanol, nonylphenoxyethylpolyethoxyethanol, and the like. These nonionic surfactants may be used either alone or in combination.

Specific examples of the anionic surfactant include sodium dodecylbenzenesulfonate, sodium lauryl sulfate, a sodium alkyl diphenyl ether disulfonate, a sodium alkylnaphthalenesulfonate, a sodium dialkylsulfosuccinate, sodium stearate, potassium oleate, sodium dioctylsulfosuccinate, a sodium polyoxyethylene alkyl ether sulfate, a sodium polyoxyethylene alkyl ether sulfate, a sodium polyoxyethylene alkyl phenyl ether sulfate, a sodium dialkylsulfosuccinate, sodium oleate, sodium t-octylphenoxyethoxy polyethoxyethylsulfate, and the like. These anionic surfactants may be used either alone or in combination.

Examples of the nonionic water-soluble polymer include polyvinyl alcohol and a derivative thereof; a starch derivative such as oxidized starch, etherified starch, and phosphorylated starch; polyvinylpyrrolidone and a polyvinylpyrrolidone derivative such as a polyvinylpyrrolidone-vinyl acetate copolymer; a cellulose derivative such as carboxymethyl cellulose and hydroxymethyl cellulose; polyacrylamide and a derivative thereof; polymethacrylamide and a derivative thereof; gelatin; casein; and the like. These nonionic water-soluble polymers may be used either alone or in combination.

Examples of the anionic water-soluble polymer include polyalginic acid and a metal salt thereof, carboxymethyl cellulose and a metal salt thereof, polyacrylic acid and a metal salt thereof, a partial hydrolysate of polyacrylamide and a metal salt thereof, a maleic acid copolymer, lignin sulfonic acid, a metal salt thereof, and a derivative thereof, an oxyorganic acid and a metal salt thereof, an alkylallylsulfonic acid and a metal salt thereof, a polyoxy alkyl aryl ether, a polyol composite, a higher polyhydric alcohol sulfonic acid and a metal salt thereof, a water-soluble protein (e.g., gelatin and glue), a metal salt thereof, and a derivative thereof, and the like. These anionic water-soluble polymers may be used either alone or in combination.

The dispersant may be used in an arbitrary amount. The dispersant is normally used in a ratio of 0.02 to 20 mass %, preferably 0.02 to 10 mass %, and particularly preferably 0.02 to 5 mass %, based on the total weight of the monomers to be copolymerized.

In one embodiment of the invention, it is preferable to produce the polymer particles using an aqueous emulsion into which a nonionic surfactant having an HLB value of 13 to 16 is introduced.

The nonionic surfactant may be introduced by adding the nonionic surfactant to water prior to polymerization, adding the nonionic surfactant to the emulsion, adding the nonionic surfactant during polymerization, or adding the nonionic surfactant after polymerization, for example. The nonionic surfactant may be added at a time, stepwise, or continuously, for example. The nonionic surfactant may be introduced by combining these methods.

A radical initiator may be used as the initiator used for copolymerization. Examples of the initiator include hydrogen peroxide; a persulfate such as ammonium persulfate, sodium persulfate, and potassium persulfate; an organic peroxide such as cumene hydroperoxide, t-butyl hydroperoxide, benzoyl peroxide, t-butyl peroxy-2-ethylhexanoate, t-butyl peroxybenzoate, and lauroyl peroxide; an azo compound such as azobisisobutyronitrile, 2,2'-azobis(2-amidinopropane) dihydrochloride, 2,2'-azobis[2-(N-phenylamidino)propane] dihydrochloride, 2,2'-azobis{2-[N-(4-chlorophenyl)amidino]propane} dihydrochloride, 2,2'-azobis{2-[N-(4-hydroxyphenyl)amidino]propane} dihydrochloride, 2,2'-azobis[2-(N-benzylamidino)propane] dihydrochloride, 2,2'-azobis[2-(N-allylamidino)propane] dihydrochloride, 2,2'-azobis{2-[N-(2-hydroxyethyl)amidino]propane} dihydrochloride, 2,2'-azobis {2-methyl-N-[1,1-bis(hydroxymethyl)-2-hydroxyethyl]propionamide}, 2,2'-azobis {2-methyl-N-[1,1-bis(hydroxymethyl)ethyl]propionamide}, 2,2'-azobis[2-methyl-N-(2-hydroxyethyl)propionamide], and 2,2'-azobis(isobutylamide) dihydrate; a redox initiator that includes the above compound, a metal ion such as an iron ion, and a reducing agent such as sodium sulfoxylate, formaldehyde, sodium pyrosulfite, sodium hydrogen sulfite, L-ascorbic acid, or Rongalite; and the like. These initiators may be used either alone or in combination.

The initiator is normally used in a ratio of 0.01 to 20 mass % based on the total mass of the monomers to be copolymerized.

In one embodiment of the invention, it is preferable to effect polymerization in the presence of a chain transfer agent in a ratio of 0.1 to 5 mass % based on the total amount of the monomer(s). It is possible to adjust the weight average molecular weight (Mw) (solubility in toluene) of the polymer particles within an appropriate range by adding the chain transfer agent. A chain transfer agent that is normally used for radical polymerization may be used as the chain transfer agent. Examples of the chain transfer agent include an organic thiol compound such as butanthiol, octanethiol, decanethiol, dodecanthiol, hexadecanethiol, thiophenol, octyl thioglycolate, octadecanethiol, cyclohexylmercaptan, octyl 2-mercaptopropionate, 2-mercaptoethyl octanoate, 1,8-dimercapto-3,6-dioxaoctane, 3-mercaptopropyltrimethoxysilane, β-mercaptopropionic acid, methyl 3-mercaptopropionate, 2-ethylhexyl 3-mercaptopropionate, n-octyl 3-mercaptopropionate, n-octylmercaptan, n-dodecylmercaptan, trimethylolpropane tris(3-mercaptopropionate), tris[(3-mercaptopropionyloxy)ethyl] isocyanurate, tetraethylene glycol bis(3-mercaptopropionate), dipentaerythritol hexakis(3-mercaptopropionate)decanetrithiol, and dodecylmercaptan; a halogen compound such as carbon tetrachloride, carbon tetrabromide, methylene chloride, bromoform, and bromotrichloroethane; and an unsaturated hydrocarbon compound such as an α-methylstyrene dimer, α-terpinene, γ-terpinene, dipentene, and terpinolene. These chain transfer agents may be used either alone or in combination. It is preferable to use an organic thiol compound that includes a hydrocarbon group having 3 or more carbon atoms as the chain transfer agent.

A pH-adjusting agent may also be used, as required. Examples of the pH-adjusting agent include sulfuric acid, hydrochloric acid, nitric acid, sodium hydroxide, potassium hydroxide, magnesium sulfate, potassium sulfate, aluminum sulfate, sodium acetate, magnesium acetate, potassium acetate, ammonia, triethanolamine, diethanolamine, monoethanolamine, and the like.

1.2.4. Features of Polymer Particles

Melting Start Temperature

The upper limit of the melting start temperature of the polymer particles used in connection with one embodiment of the invention is preferably 65° C. or less, more preferably 55° C. or less, still more preferably 50° C. or less, and particularly preferably 45° C. or less. The lower limit of the melting start temperature of the polymer particles is preferably 20° C. or more. When the ink composition is caused to adhere to the recording medium, the polymer particles form a number of voids between the white coloring materials. When the melting start temperature of the polymer particles is within the above range, the polymer particles melt at a temperature equal to or higher than the melting start temperature to form a void layer. It is considered that the scattering of light increases due to the void layer, so that the white color development capability is improved.

The term "melting start temperature" used herein in connection with the polymer particles used in connection with one embodiment of the invention refers to the flow start temperature (° C.) measured when 1 g of a specimen is caused to flow using a Koka-type flow tester (e.g., flow tester "CFT-500D" manufactured by Shimadzu Corporation) (die pore size: 1 mm (φ)×1 mm, pressure: 30 kg/cm², heating rate: 5° C./min).

Glass Transition Temperature

The glass transition temperature of the polymer particles used in connection with one embodiment of the invention is preferably −30 to 0° C. When the glass transition temperature of the polymer particles is within the above range, the polymer particles form a film at room temperature to form a void layer. The glass transition temperature may be adjusted by adjusting the ratio of the monomers. The glass transition temperature of the polymer particles used in connection with one embodiment of the invention may be calculated from the DSC curve in accordance with JIS K 7121.

Average Particle Size D50

The average particle size D50 (on a volume basis) of the polymer particles used in connection with one embodiment of the invention is preferably 50 to 1,000 nm, more preferably 50 to 800 nm, still more preferably 50 to 500 nm, and particularly preferably 100 to 500 nm. When the average particle size D50 of the polymer particles is within the above range, the polymer particles can form voids between the white coloring materials when the ink composition is caused to adhere to the recording medium. When the ink composition is ejected using an inkjet printer, it is possible to achieve good ejection stability from the nozzle head.

Note that the average particle size D50 of the polymer particles is controlled by adjusting the amount of surfactant and the amount of initiator. The particle size decreases as the amount of surfactant increases, and also decreases as the amount of initiator decreases.

The average particle size D50 of the polymer particles may be measured using a particle size distribution analyzer that utilizes a dynamic light scattering method as the measurement principle. Examples of such a particle size distribution analyzer include a particle size analyzer "FPAR-1000" (manufactured by Otsuka Electronics Co., Ltd.), a laser particle size analysis system "LPA-3000/3100" (manufactured by Otsuka Electronics Co., Ltd.), a laser diffraction particle size analyzer "SALD-2000A" (manufactured by Shimadzu Corporation), and the like.

Relationship Between Average Particle Size and Melting Start Temperature

The polymer particles used in connection with one embodiment of the invention is characterized in that the average particle size D50 and the melting start temperature satisfy the relationship represented by the following expression (1), $$Y \leq 0.33X + 20 \quad (1)$$

where X is the average particle size D50 (nm) and Y is the melting start temperature (° C.).

The expression (1) represents a law that was found by the inventors of the invention as a result of repeated experiments. When specific polymer particles that satisfy the relationship represented by the expression (1) are used, it is possible to achieve the advantageous effect of the invention (i.e., the shield capability and the color development capability of a white image are improved when the ink composition is caused to adhere to the recording medium). It is considered that the above effect is achieved through the following mechanism. Specifically, when the average particle size D50 and the melting start temperature of the polymer particles satisfy the relationship represented by the expression (1), the polymer particles form a number of voids between the white coloring materials when the ink composition is caused to adhere to the recording medium, and melt to form a layer (void layer) that includes the voids. It is considered that the scattering of light increases due to the void layer, so that the white color development capability is improved.

Solubility in Toluene

The solubility in toluene of the polymer particles used in connection with one embodiment of the invention is preferably 10 to 80 mass %, more preferably 10 to 60 mass %, and particularly preferably 10 to 40 mass %. The solubility in toluene of the polymer particles has a correlation with the weight average molecular weight (Mw) of the polymer particles. When the solubility in toluene is within the above range, the polymer particles easily melt on the recording medium, and the void layer is easily formed. Therefore, it is possible to easily achieve the advantageous effect of the invention (i.e., the shield capability and the color development capability of a white image are improved when the ink composition is caused to adhere to the recording medium).

The solubility in toluene may be measured as described below. An aqueous dispersion of the polymer particles used in connection with one embodiment of the invention is applied to a glass plate, dried at room temperature for 24 hours, and dried for 12 hours under vacuum to obtain a film. 1 g of the resulting film is immersed in toluene, and allowed to stand at 23° C. for 16 hours in an airtight container. After filtering the toluene phase through a wire gauze (300 mesh) to separate the insoluble component, toluene included in the filtrate is evaporated off, and the mass (Y (g)) of the residue is measured. The solubility in toluene is calculated using the following expression (2).

$$\text{Solubility in toluene (mass \%)} = (Y/1) \times 100 \quad (2)$$

1.3. Solvent

The ink composition according to one embodiment of the invention includes the solvent. The ink composition may include at least one of water and an organic solvent (described later) as the solvent. When the ink composition includes water as the solvent, the ink composition is used as an aqueous ink. When the ink composition (white ink composition) substantially does not include water, the ink composition is used as a non-aqueous ink. It is preferable that the ink composition according to one embodiment of the invention be an aqueous ink from the viewpoint of the stability of the polymer particles.

Note that the expression "substantially does not include A" used herein means that A is not intentionally added when producing an ink, or A is not added in an amount more than an amount that sufficiently achieves the significance of the addition of A. For example, the expression "substantially does not include A" used herein in connection with the ink composition means that the ink composition does not include A in a ratio of 1.0 mass % or more, preferably 0.5 mass % or more, more preferably 0.1 mass % or more, still more preferably 0.05 mass % or more, particularly preferably 0.01 mass % or more, and yet more preferably 0.001 mass % or more.

Water

When the ink composition includes water, it is preferable to use water from which ionic impurities have been removed as much as possible (e.g., pure water such as ion-exchanged water, water purified by ultrafiltration, water purified by reverse osmosis, or distilled water, or ultrapure water). When water sterilized by UV irradiation, addition of hydrogen peroxide, or the like is used, it is possible to prevent the growth of fungi and bacteria when a pigment dispersion or an ink prepared using the pigment dispersion is stored for a long time.

When the ink composition is an aqueous ink, the content of water in the ink composition may be 50 mass % or more based on the total mass of the ink composition. An organic solvent (described below) may be added to the aqueous ink.

Organic Solvent

The ink composition according to one embodiment of the invention may include an organic solvent. The ink composition may include a plurality of types of organic solvents. The organic solvent is not particularly limited. Examples of the organic solvent include a 1,2-alkanediol, a polyhydric alcohol (excluding the 1,2-alkanediol), a pyrrolidone derivative, a lactone, a glycol ether, and the like.

Examples of the 1,2-alkanediol include 1,2-propanediol, 1,2-butanediol, 1,2-pentanediol, 1,2-hexanediol, 1,2-octanediol, and the like. Since the 1,2-alkanediol ensures that the recording medium is uniformly wetted with the resulting ink, it may be possible to form an image that exhibits excellent adhesion on the recording medium. When the ink composition includes the 1,2-alkanediol, the content of the 1,2-alkanediol in the ink composition may be 1 to 20 mass % based on the total mass of the ink composition.

Examples of the polyhydric alcohol include ethylene glycol, diethylene glycol, propylene glycol, dipropylene glycol, 1,3-propanediol, 1,4-butanediol, 1,6-hexanediol, trimethylolpropane, glycerol, and the like. The polyhydric alcohol may preferably be used from the viewpoint of suppressing or reducing the occurrence of a situation in which the resulting ink is dried and solidified on the nozzle formation side of a recording head of an inkjet recording device, and reducing the occurrence of clogging, an ejection failure, and the like. When the ink composition includes the polyhydric alcohol, the content of the polyhydric alcohol in the ink composition may be 2 to 20 mass % based on the total mass of the ink composition.

Examples of the pyrrolidone derivative include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like. The pyrrolidone derivative may serve as a good resin component solubilizer. When the ink composition includes the pyrrolidone derivative, the content of the pyrrolidone derivative in the ink composition may be 0.5 to 10 mass % based on the total mass of the ink composition.

The term "lactone" used herein refers to a cyclic compound that includes an ester group (—CO—O—) in the ring. The lactone is not particularly limited as long as the lactone falls under the above definition. It is preferable to use a lactone having 2 to 9 carbon atoms. Specific examples of the lactone include α-ethyllactone, α-acetolactone, β-propiolactone, γ-butyrolactone, δ-valerolactone, ε-caprolactone, ζ-enantiolactone, η-caprylolactone, γ-valerolactone, γ-heptalactone, γ-nonalactone, β-methyl-δ-valerolactone, 2-butyl-2-ethylpropyolactone, α,α-diethylpropyolactone, and the like. Among these, γ-butyrolactone is particularly preferable. When the recording medium is a vinyl chloride resin film or the like, the lactone causes the resulting ink to penetrate the recording medium to improve adhesion. The lactone is preferably used when the ink composition is a non-aqueous ink. In this case, the content of the lactone in the ink composition (white ink composition) may be 5 to 30 mass % based on the total mass of the ink composition.

Examples of the glycol ether include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethyl hexyl ether, diethylene glycol mono-2-ethyl hexyl ether, triethylene glycol mono-2-ethyl hexyl ether, diethylene glycol mono-2-ethyl pentyl ether, ethylene glycol mono-2-ethyl pentyl ether, ethylene glycol mono-2-ethyl hexyl ether, diethylene glycol mono-2-ethyl hexyl ether, ethylene glycol mono-2-methyl pentyl ether, diethylene glycol mono-2-methyl pentyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monomethyl ether, and the like. These glycol ethers may be used either alone or in combination. The glycol ether can control the wettability of the recording medium with the resulting ink, and the penetration rate of the resulting ink. This makes it possible to record a clear image that has small shading non-uniformity. When the ink composition is used as an aqueous ink, the content of the glycol ether in the ink composition may be 0.05 to 6 mass % based on the total mass of the ink composition. When the ink composition is used as a non-aqueous ink, the content of the glycol ether in the ink composition may be 70 to 90 mass % based on the total mass of the ink composition.

1.4. Surfactant

The ink composition according to one embodiment of the invention may include a surfactant. The surfactant decreases the surface tension of the ink composition, and improves the wettability of the recording medium with the ink composition. For example, an acetylene glycol-based surfactant, a silicone-based surfactant, and a fluorine-based surfactant may preferably be used as the surfactant.

The acetylene glycol-based surfactant is not particularly limited. Examples of the acetylene glycol-based surfactant include SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (manufactured by Air Products and Chemicals, Inc.); OLFINE B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (manufactured by Nissin Chemical Industry Co., Ltd.); and ACETYLENOL E00, E00P, E40, and E100 (manufactured by Kawaken Fine Chemicals Co., Ltd.).

The silicone-based surfactant is not particularly limited. Examples of a preferable silicone-based surfactant include a polysiloxane-based compound. The polysiloxane-based compound is not particularly limited. Examples of the polysiloxane-based compound include a polyether-modified organosiloxane. Examples of a commercially-available product of the polyether-modified organosiloxane include BYK-306, BYK-307, BYK-333, BYK-341, BYK-345, BYK-346, and BYK-348 (manufactured by BYK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (manufactured by Shin-Etsu Chemical Co., Ltd.).

It is preferable to use a fluorine-modified polymer as the fluorine-based surfactant. Specific examples of the fluorine-based surfactant include BYK-340 (manufactured by BYK Japan KK).

These surfactants may be used either alone or in combination. When the ink composition includes the surfactant, the content of the surfactant in the ink composition is preferably 0.1 to 1.5 mass % based on the total mass of the ink composition.

1.5. Additional Component

The ink composition according to one embodiment of the invention may optionally include a thickener, a pH-adjusting agent, a preservative/fungicide, a rust preventive, a chelating agent, and the like.

Thickener

The thickener may be used to adjust the viscosity of the ink. Examples of the thickener include polyvinyl alcohol, poly(meth)acrylic acid, a polyether, polyvinylpyrrolidone, polyvinyl formal, a protein (e.g., gelatin, casein, and glue), a polysaccharide (e.g., pullulan, dextran, dextrin, cyclodextrin, carrageenan, pectin, glucomannan, sodium alginate, xanthan gum, gum arabic, locust bean gum, tragacanth gum, guar gum, and tamarind gum), starch (e.g., starch, oxidized starch, carboxyl starch, and dialdehyde starch), cellulose and a derivative thereof (e.g., methyl cellulose, ethyl cellulose, carboxymethyl cellulose, hydroxyethyl cellulose, hydroxypropyl cellulose, and hydroxypropylmethyl cellulose), an alginate (e.g., sodium alginate, potassium alginate, and ammonium alginate), an alginic ester (e.g., propylene glycol alginate), and the like.

When the ink composition includes the thickener, the content of the thickener in the ink composition may be appropriately set taking account of the desired viscosity of the ink composition. The content of the thickener in the ink composition may be 1 to 10 mass % based on the total mass of the ink composition.

pH-Adjusting Agent

Examples of the pH-adjusting agent include potassium dihydrogen phosphate, disodium hydrogen phosphate, sodium hydroxide, lithium hydroxide, potassium hydroxide, ammonia, diethanolamine, triethanolamine, tripropanolamine, potassium carbonate, sodium carbonate, sodium hydrogen carbonate, and the like.

Preservative/Fungicide

Examples of the preservative/fungicide include sodium benzoate, pentachlorophenol sodium salt, 2-pyridinethiol-1-oxide sodium salt, sodium sorbate, sodium dehydroacetate, 1,2-dibenzisothiazolin-3-one, and the like. Examples of a commercially-available preservative/fungicide include PROXEL XL2 and PROXEL GXL (manufactured by Avecia); DENICIDE CSA and DENICIDE NS-500W (manufactured by Nagase ChemteX Corporation); and the like.

Rust Preventive

Examples of the rust preventive include benzotriazole and the like.

Chelating Agent

Examples of the chelating agent include ethylenediaminetetraacetic acid and a salt thereof (e.g., disodium dihydrogen ethylenediaminetetraacetate), and the like.

1.6. Method for Producing Ink Composition

The ink composition according to one embodiment of the invention may be produced by mixing the components (materials) in an arbitrary order, and optionally filtering the mixture to remove impurities. It is preferable to mix the white coloring material after uniformly dispersing the white coloring material in the solvent since handling is facilitated. The materials are preferably mixed by sequentially adding the materials to a container equipped with a stirrer (e.g., mechanical stirrer or magnetic stirrer), and stirring the mixture. The mixture may optionally be subjected to centrifugal filtration or filtration using a filter, for example.

1.7. Properties of Ink Composition

Relationship Between Average Particle Size of White Coloring Material and Average Particle Size of Polymer Particles The ink composition according to one embodiment of the invention is preferably characterized in that the average particle size D50 of the white coloring material and the average particle size D50 of the polymer particles satisfy the relationship "D1:D2=1:0.01 to 1:5", and more preferably the relationship "D1:D2=1:0.1 to 1:1", where D1 (nm) is the average particle size D50 of the white coloring material, and D2 (nm) is the average particle size D50 of the polymer particles. When the average particle size of the white coloring material and the average particle size of the polymer particles satisfy the above relationship, the polymer particles easily enter the space between the white coloring materials, and a number of voids are easily formed when the ink composition is caused to adhere to the recording medium. This makes it possible to further improve the white color development capability of the recorded image.

Quantitative Relationship Between White Coloring Material and Polymer Particles

The ink composition according to one embodiment of the invention is preferably characterized in that the content of the white coloring material and the content of the polymer particles satisfy the relationship "W1:W2=1:5 to 5:1", and more preferably the relationship "W1:W2=2:1 to 3:1", where W1 is the content of the white coloring material, and W2 is the content of the polymer particles. When the quantitative relationship between the white coloring material and the polymer particles is within the above range, the polymer particles easily enter the space between the white coloring materials, and a number of voids are easily formed when the ink composition is caused to adhere to the recording medium. This makes it possible to further improve the white color development capability of the recorded image.

Surface Tension

The surface tension at 20° C. of the ink composition according to one embodiment of the invention is preferably 20 to 40 mN/m, and more preferably 25 to 35 mN/m, from the viewpoint of the balance between the image quality and the ink reliability when applied to an inkjet recording device. The surface tension of the ink composition may be determined by measuring the surface tension when a platinum plate is wetted with the ink at 20° C. using an automatic surface tensiometer "CBVP-Z" (manufactured by Kyowa Interface Science Co., Ltd.), for example.

Viscosity

The viscosity at 20° C. of the ink composition according to one embodiment of the invention is preferably 3 to 10 mPa·s, and more preferably 3 to 8 mPa·s, from the above point of view. The viscosity at 20° C. of the ink composition may be measured using a viscoelasticity tester "MCR-300" (manufactured by Pysica), for example.

2. Examples

The invention is further described below by way of examples and comparative examples. Note that the invention is not limited to the following examples.

2.1. Preparation of Pigment Dispersion

Preparation of Dispersion of Pigment 1

160 g of a commercially-available titanium dioxide powder (rutile type, primary particle size: 80 nm) was added to 480 g of ion-exchanged water. After the addition of 160 g of a 10 wt % sodium hexametaphosphate aqueous solution, the mixture was stirred at room temperature to prepare a slurry solution. 83.7 g of zirconium oxychloride octahydrate was added to the slurry solution. The pH of the resulting mixture was adjusted to 3.5 to 4.0 by slowly adding a sodium hydroxide aqueous solution, and the resulting mixture was stirred for 20 hours. The resulting slurry solution was filtered under a pressure of 0.4 MPa, and the resulting solid was dispersed in 480 mL of ion-exchanged water. The resulting dispersion was filtered under a pressure of 0.4 MPa, and dried in the filtration device at room temperature under pressure. The resulting powder was heated from room temperature to 500° C. in air at a heating rate of 5° C./min using an electric furnace, and calcined at 500° C. for 2 hours to obtain a powder. The powder thus obtained is referred to as "pigment 1". The average secondary particle size of the pigment 1 was 288 nm. 20 parts by mass of the pigment 1 and 80 parts by mass of ion-exchanged water were sufficiently mixed and stirred to obtain a dispersion of the pigment 1 having a solid content of 20 mass %.

Preparation of Dispersions of Pigments 2 to 4

Dispersions of pigments 2 to 4 were prepared in the same manner as the dispersion of the pigment 1, except that the type of the titanium dioxide powder was changed as listed in Table 1, the pH and the drying or calcining conditions were appropriately changed, and the amounts of titanium dioxide, the 10 wt % sodium hexametaphosphate aqueous solution, and zirconium oxychloride octahydrate were changed so that the pigment having the composition listed in Table 1 can be obtained.

Dispersion of Pigment 5

A slurry ("NanoTek (registered trademark) Slurry" manufactured by C.I. Kasei Co., Ltd.) including titanium dioxide particles (average secondary particle size: 330 nm, solid content: 15%) was used as a non-porous titanium dioxide dispersion.

Preparation of Dispersion of Pigment 6

50 parts by mass of pigment blue 15:3 (cyan pigment), 13 parts by mass of a styrene-acrylic resin (weight average molecular weight: 78,000, resin acid value: 100), and 37 parts by mass of ion-exchanged water were mixed and stirred to obtain a mixture. The mixture was subjected to a dispersion treatment for 6 hours together with zirconia beads (diameter: 1.5 mm) using a sand mill (manufactured by Yasukawa Seisakusho). The zirconia beads were separated using a separator to obtain a non-porous cyan pigment dispersion (average secondary particle size 110 nm).

Measurement of Average Particle Size D50 (D1)

The average particle size D50 (D1) was measured using a dynamic light scattering Nanotrac particle size distribution analyzer ("Microtrac UPA" manufactured by Nikkiso Co., Ltd.) under the following conditions. Note that the MV value was taken as the average particle size D50.

Measurement time: 120 s

Number of measurements: 3

Light transmission of particles: yes

Refractive index of particles: 2.52

Particle shape: non-spherical

Density: 4.23

Solvent: water

Refractive index of solvent: 1.33

Filter: Standard

Sensitivity: Standard

TABLE 1

|  | Shape | Crystal form | Primary particle size (nm) | Secondary particle size (nm) |
|---|---|---|---|---|
| Pigment 1 | Porous titanium dioxide | Rutile | 80 | 288 |
| Pigment 2 | Porous titanium dioxide | Rutile | 80 | 300 |
| Pigment 3 | Porous titanium dioxide | Anatase/rutile | 70 | 212 |
| Pigment 4 | Porous titanium dioxide | Rutile | 70 | 182 |
| Pigment 5 | Non-porous titanium dioxide | Rutile | — | 330 |
| Pigment 6 | Non-porous PB 15:3 | — | — | 110 |

2.2. Synthesis of Polymer Particles

Synthesis of Polymer Particles 1

A reaction vessel equipped with a stirrer, a reflux capacitor, a dropping device, and a thermometer, was charged with 700 g of ion-exchanged water and 5 g of sodium dodecyl diphenyl ether disulfonate. The temperature inside the reaction vessel was increased to 75° C. with stirring while replacing the atmosphere inside the reaction vessel with nitrogen. 10 g of potassium persulfate (initiator) was dissolved in the mixture while maintaining the temperature inside the reaction vessel at 75° C., and an emulsion prepared by adding 300 g of styrene, 550 g of 2-ethylhexyl acrylate, 150 g of 2-hydroxyethyl methacrylate, and 1 g of n-dodecylmercaptan to 500 g of ion-exchanged water and 5 g of sodium dodecyl diphenyl ether disulfonate with stirring, was continuously added dropwise to the reaction solution over 4 hours. After the dropwise addition, the mixture was aged for 3 hours. The resulting aqueous emulsion was cooled to room temperature, and ion-exchanged water was added to the aqueous emulsion to adjust the solid content to 45 wt %.

Synthesis of Polymer Particles 2

A reaction vessel equipped with a stirrer, a reflux capacitor, a dropping device, and a thermometer, was charged with 900 g of ion-exchanged water and 20 g of the aqueous emulsion obtained in Synthesis Example 1 ("Synthesis of polymer particles 1"). The temperature inside the reaction vessel was increased to 75° C. with stirring while replacing the atmosphere inside the reaction vessel with nitrogen. An aqueous solution prepared by dissolving 10 g of ammonium persulfate (initiator) in 100 g of ion-exchanged water was added to the mixture while maintaining the temperature inside the reaction vessel at 75° C., and an emulsion prepared by adding 150 g of styrene, 50 g of methyl methacrylate, 650 g of n-butyl acrylate, 150 g of 2-hydroxyethyl methacrylate, and 1 g of n-dodecylmercaptan to 500 g of ion-exchanged water and 5 g of sodium dodecyl diphenyl ether disulfonate with stirring, was continuously added dropwise to the reaction solution over 4 hours. After the dropwise addition, the mixture was aged for 3 hours. The resulting aqueous emulsion was cooled to room temperature, and ion-exchanged water was added to the aqueous emulsion to adjust the solid content to 45 wt %.

Synthesis of Polymer Particles 3

A reaction vessel equipped with a stirrer, a reflux capacitor, a dropping device, and a thermometer, was charged with 800 g of ion-exchanged water and 5 g of sodium dodecyl diphenyl ether disulfonate. The temperature inside the reaction vessel was increased to 75° C. with stirring while replacing the atmosphere inside the reaction vessel with nitrogen. 10 g of potassium persulfate (initiator) was dissolved in the mixture while maintaining the temperature inside the reaction vessel at 75° C., and an emulsion prepared by adding 200 g of styrene, 100 g of methyl methacrylate, 600 g of 2-ethylhexyl acrylate, and 100 g of 2-hydroxyethyl methacrylate to 500 g of ion-exchanged water and 5 g of sodium dodecyl diphenyl ether disulfonate with stirring, was continuously added dropwise to the reaction solution over 4 hours. After the dropwise addition, the mixture was aged for 3 hours. The resulting aqueous emulsion was cooled to room temperature, and ion-exchanged water and a sodium hydroxide aqueous solution were added to the aqueous emulsion to adjust the solid content and the pH to 45 wt % and 7, respectively.

Synthesis of Polymer Particles 4

A reaction vessel equipped with a stirrer, a reflux capacitor, a dropping device, and a thermometer, was charged with 750 g of ion-exchanged water and 10 g of sodium dodecyl sulfate. The temperature inside the reaction vessel was increased to 75° C. with stirring while replacing the atmosphere inside the reaction vessel with nitrogen. 10 g of potassium persulfate (initiator) was dissolved in the mixture while maintaining the temperature inside the reaction vessel at 75° C., and an emulsion prepared by adding 350 g of styrene, 100 g of methyl methacrylate, 450 g of 2-ethylhexyl acrylate, and 100 g of 2-hydroxyethyl methacrylate to 500 g of ion-exchanged water and 5 g of sodium dodecyl diphenyl ether disulfonate with stirring, was continuously added dropwise to the reaction solution over 4 hours. After the dropwise addition, the mixture was aged for 3 hours. The resulting aqueous emulsion was cooled to room temperature, and ion-exchanged water and a sodium hydroxide aqueous solution were added to the aqueous emulsion to adjust the solid content and the pH to 45 wt % and 7, respectively.

Synthesis of Polymer Particles 5

A reaction vessel equipped with a stirrer, a reflux capacitor, a dropping device, and a thermometer, was charged with 1,500 g of ion-exchanged water and 20 g of the aqueous emulsion obtained in Synthesis Example 3 ("Synthesis of polymer particles 3"). The temperature inside the reaction vessel was increased to 75° C. with stirring while replacing the atmosphere inside the reaction vessel with nitrogen. An aqueous solution prepared by dissolving 10 g of ammonium persulfate (initiator) in 100 g of ion-exchanged water was added to the mixture while maintaining the temperature inside the reaction vessel at 75° C., and an emulsion prepared by adding 260 g of styrene, 670 g of n-butyl acrylate, 20 g of acrylic acid, 50 g of acrylamide, and 20 g of polyethylene glycol dimethacrylate to 500 g of ion-exchanged water and 5 g of sodium dodecyl sulfate with stirring, was continuously added dropwise to the reaction solution over 4 hours. After the dropwise addition, the mixture was aged for 3 hours. The resulting aqueous emulsion was cooled to room temperature, and ion-exchanged water was added to the aqueous emulsion to adjust the solid content to 32 wt %.

Synthesis of Polymer Particles 6

A reaction vessel equipped with a stirrer, a reflux capacitor, a dropping device, and a thermometer, was charged with 1,500 g of ion-exchanged water and 20 g of the aqueous emulsion obtained in Synthesis Example 4 ("Synthesis of polymer particles 4"). The temperature inside the reaction vessel was increased to 75° C. with stirring while replacing the atmosphere inside the reaction vessel with nitrogen. An aqueous solution prepared by dissolving 10 g of ammonium persulfate (initiator) in 100 g of ion-exchanged water was added to the mixture while maintaining the temperature inside the reaction vessel at 75° C., and an emulsion prepared by adding 350 g of styrene, 560 g of n-butyl acrylate, 35 g of methacrylic acid, 55 g of acrylamide, and 20 g of polyethylene glycol dimethacrylate to 500 g of ion-exchanged water and 5 g of sodium dodecyl sulfate with stirring, was continuously added dropwise to the reaction solution over 4 hours. After the dropwise addition, the mixture was aged for 3 hours. The resulting aqueous emulsion was cooled to room temperature, and ion-exchanged water was added to the aqueous emulsion to adjust the solid content to 32 wt %.

Synthesis of Polymer Particles 7

A reaction vessel equipped with a stirrer, a reflux capacitor, a dropping device, and a thermometer, was charged with 3,000 g of ion-exchanged water and 10 g of sodium dodecyl sulfate. The temperature inside the reaction vessel was increased to 75° C. with stirring while replacing the atmosphere inside the reaction vessel with nitrogen. 10 g of potassium persulfate (initiator) was dissolved in the mixture while maintaining the temperature inside the reaction vessel at 75° C., and an emulsion prepared by adding 360 g of styrene, 500 g of n-butyl acrylate, 20 g of methacrylic acid, 10 g of 2-hydroxyethyl methacrylate, 20 g of acrylamide, and 80 g polyethylene glycol dimethacrylate to 500 g of ion-exchanged water and 5 g of sodium dodecyl diphenyl ether disulfonate with stirring, was continuously added dropwise to the reaction solution over 4 hours. After the dropwise addition, the mixture was aged for 3 hours. The resulting aqueous emulsion was cooled to room temperature, and ion-exchanged water and a sodium hydroxide aqueous solution were added to the aqueous emulsion to adjust the solid content and the pH to 18 wt % and 8, respectively.

Synthesis of Polymer Particles 8

A reaction vessel equipped with a stirrer, a reflux capacitor, a dropping device, and a thermometer, was charged with 1,500 g of ion-exchanged water and 20 g of the aqueous emulsion obtained in Synthesis Example 6 ("Synthesis of polymer particles 6"). The temperature inside the reaction vessel was increased to 75° C. with stirring while replacing the atmosphere inside the reaction vessel with nitrogen. An aqueous solution prepared by dissolving 10 g of ammonium persulfate (initiator) in 100 g of ion-exchanged water was added to the mixture while maintaining the temperature inside the reaction vessel at 75° C., and an emulsion prepared by adding 260 g of styrene, 630 g of n-butyl acrylate, 30 g of methacrylic acid, 40 g of acrylamide, and 40 g of polyethylene glycol dimethacrylate to 500 g of ion-exchanged water and 5 g of sodium dodecyl sulfate with stirring, was continuously added dropwise to the reaction solution over 4 hours. After the dropwise addition, the mixture was aged for 3 hours. The resulting aqueous emulsion was cooled to room temperature, and ion-exchanged water and a sodium hydroxide aqueous solution were added to the aqueous emulsion to adjust the solid content and the pH to 32 wt % and 7.5, respectively.

Synthesis of Polymer Particles 9

A reaction vessel equipped with a stirrer, a reflux capacitor, a dropping device, and a thermometer, was charged with 1,500 g of ion-exchanged water and 20 g of the aqueous emulsion obtained in Synthesis Example 6 ("Synthesis of polymer particles 6"). The temperature inside the reaction vessel was increased to 75° C. with stirring while replacing the atmosphere inside the reaction vessel with nitrogen. An aqueous solution prepared by dissolving 10 g of ammonium persulfate (initiator) in 100 g of ion-exchanged water was added to the mixture while maintaining the temperature inside the reaction vessel at 75° C., and an emulsion prepared by adding 260 g of styrene, 590 g of n-butyl acrylate, 30 g of methacrylic acid, 40 g of acrylamide, and 80 g of polyethylene glycol dimethacrylate to 500 g of ion-exchanged water and 5 g of sodium dodecyl sulfate with stirring, was continuously added dropwise to the reaction solution over 4 hours. After the dropwise addition, the mixture was aged for 3 hours. The resulting aqueous emulsion was cooled to room temperature, and ion-exchanged water and a sodium hydroxide aqueous solution were added to the aqueous emulsion to adjust the solid content and the pH to 32 wt % and 7.5, respectively.

Measurement of Melting Start Temperature

The flow start temperature (° C.) measured when 1 g of a specimen was caused to flow using a flow tester "CFT-500D" (manufactured by Shimadzu Corporation) (die pore size: 1 mm ($\varphi$)×1 mm, pressure: 30 kg/cm$^2$, heating rate: 5° C./min) was taken as the melting start temperature (Ti).

Measurement of Glass Transition Temperature (Tg)

The glass transition temperature (Tg) was calculated from the DSC curve in accordance with JIS K 7121.

Measurement of Solubility in Toluene

An aqueous dispersion of the polymer particles was applied to a glass plate, dried at room temperature for 24 hours, and dried for 12 hours under vacuum to obtain a film. 1 g of the resulting film was immersed in toluene, and allowed to stand at 23° C. for 16 hours in an airtight container. After filtering the toluene phase through a wire gauze (300 mesh) to separate the insoluble component, toluene included in the filtrate was evaporated off, and the mass (Y (g)) of the residue was measured. The solubility in toluene was calculated using the following expression (2).

$$\text{Solubility in toluene (mass \%)} = (Y/1) \times 100 \qquad (2)$$

Measurement of Average Particle Size D50 (D2)

The average particle size D50 (D2) was measured using a particle size analyzer that utilizes a dynamic light scattering method as the measurement principle ("FPAR-1000" manufactured by Otsuka Electronics Co., Ltd.) under the following conditions.

Measurement time: 180 s
Number of measurements: 3
Measurement temperature: 25.0° C.
Solvent: water
Refractive index of solvent: 1.3313
Viscosity of solvent: 0.8852
Scattering intensity: 30,000±5,000

The melting start temperature, the glass transition temperature, the solubility in toluene, and the average particle size D50 of the polymer particles synthesized in Synthesis Examples 1 to 9 are listed in Table 2.

TABLE 2

| | Melting start temperature (° C.) | Tg (° C.) | Solubility in toluene (mass %) | Average particle size (nm) |
|---|---|---|---|---|
| Polymer 1 | 44 | −23 | 37 | 220 |
| Polymer 2 | 40 | −23 | 29 | 350 |
| Polymer 3 | 67 | −23 | 17 | 157 |
| Polymer 4 | 81 | −5 | 13 | 159 |
| Polymer 5 | 100 | −23 | 2 | 430 |
| Polymer 6 | 125 | −5 | 4 | 450 |
| Polymer 7 | 81 | −6 | 15 | 60 |
| Polymer 8 | 164 | −23 | 15 | 510 |
| Polymer 9 | 185 | −23 | 7 | 520 |

Figure 1:
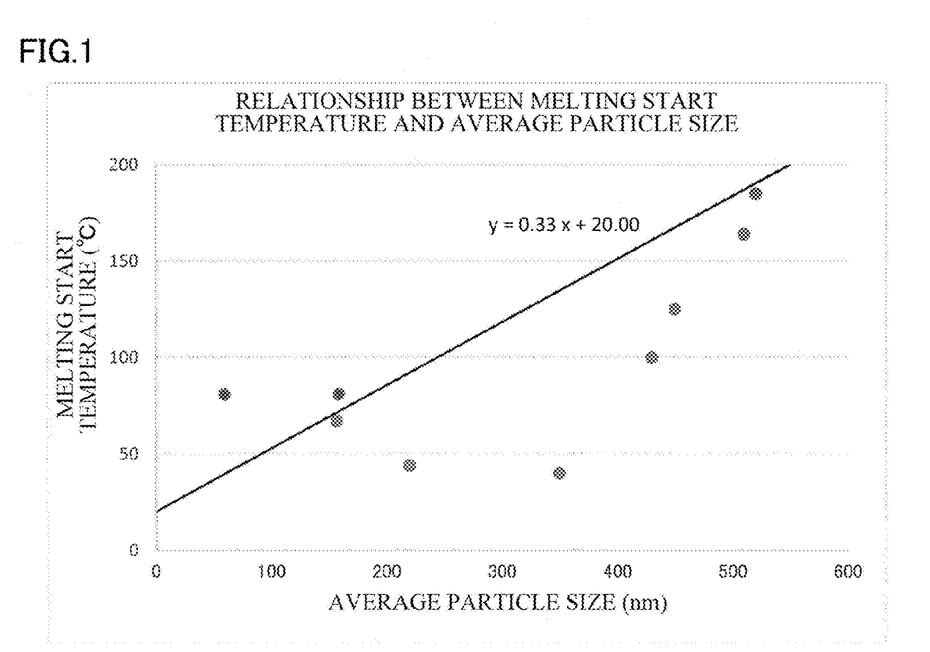
FIG. 1 is a graph illustrating the relationship between the melting start temperature and the average particle size of the polymer particles synthesized in the examples.

FIG. 1 is a graph illustrating the relationship between the melting start temperature (° C.) and the average particle size D50 (nm) of the polymer particles.

2.3. Preparation of Ink Composition

Each component was mixed and stirred so that the compositions listed in Tables 3 and 4 were obtained, and filtered through a membrane filter having a pore size of 5 micrometers to obtain inks 1 to 18. The details of SURFYNOL DF110D and BYK-348 listed in Tables 3 and 4 are as follows. In Tables 3 and 4, the content of the pigment and the content of the polymer particles are on a solid basis, and the numerical values indicate the content (mass %) in the ink.

SURFYNOL DF110D (manufactured by Air Products and Chemicals Inc., acetylene glycol-based surfactant)

BYK-348 (manufactured by BYK Japan KK, silicone-based surfactant)

TABLE 3

| Ink composition | | Ink 1 | Ink 2 | Ink 3 | Ink 4 | Ink 5 |
|---|---|---|---|---|---|---|
| Pigment | Type | Pigment 1 | Pigment 1 | Pigment 1 | Pigment 1 | Pigment 4 |
| | Content (on solid basis) | 10 | 10 | 10 | 10 | 10 |
| Polymer particles | Type | Polymer 1 | Polymer 2 | Polymer 3 | Polymer 4 | Polymer 7 |
| | Content (on solid basis) | 5 | 5 | 5 | 5 | 5 |
| Surfactant | SURFYNOL DF110D | 0.3 | 0.3 | 0.3 | 0.3 | 0.3 |
| | BYK-348 | 0.4 | 0.4 | 0.4 | 0.4 | 0.4 |
| pH-adjusting agent | Tripropanolamine | 0.1 | 0.1 | 0.1 | 0.1 | 0.1 |
| Solvent | Propylene glycol | 10 | 10 | 10 | 10 | 10 |
| | 1,2-Hexanediol | 1 | 1 | 1 | 1 | 1 |
| | Water | Balance | Balance | Balance | Balance | Balance |
| | $D_1/D_2$ | 1.31 | 0.82 | 1.83 | 1.81 | 3.03 |
| | Absorbance of ink | 1.707 | 1.748 | — | — | 1.538 |
| Evaluation results | Ejection stability | A | A | A | A | B |
| | Shield capability | B | A | B | C | C |
| | Degree of whiteness | A | A | B | C | C |
| | Precipitation properties | B | B | B | B | A |

| Ink composition | | Ink 6 | Ink 7 | Ink 8 | Ink 9 | Ink 10 |
|---|---|---|---|---|---|---|
| Pigment | Type | Pigment 4 | Pigment 4 | Pigment 1 | Pigment 1 | Pigment 1 |
| | Content (on solid basis) | 10 | 10 | 10 | 10 | 10 |
| Polymer particles | Type | Polymer 5 | Polymer 6 | Polymer 7 | Polymer 8 | Polymer 9 |
| | Content (on solid basis) | 5 | 5 | 5 | 5 | 5 |
| Surfactant | SURFYNOL DF110D | 0.3 | 0.3 | 0.3 | 0.3 | 0.3 |
| | BYK-348 | 0.4 | 0.4 | 0.4 | 0.4 | 0.4 |
| pH-adjusting agent | Tripropanolamine | 0.1 | 0.1 | 0.1 | 0.1 | 0.1 |
| Solvent | Propylene glycol | 10 | 10 | 10 | 10 | 10 |
| | 1,2-Hexanediol | 1 | 1 | 1 | 1 | 1 |
| | Water | Balance | Balance | Balance | Balance | Balance |
| | $D_1/D_2$ | 0.42 | 0.40 | 4.80 | 0.56 | 0.55 |
| | Absorbance of ink | 1.746 | 1.711 | 1.623 | 1.711 | 1.711 |
| Evaluation results | Ejection stability | B | B | B | B | B |
| | Shield capability | B | B | C | A | A |
| | Degree of whiteness | A | B | C | A | A |
| | Precipitation properties | A | A | C | B | B |

TABLE 4

| Ink composition | | Ink 11 | Ink 12 | Ink 13 | Ink 14 | Ink 15 | Ink 16 | Ink 17 | Ink 18 |
|---|---|---|---|---|---|---|---|---|---|
| Pigment | Type | Pigment 2 | Pigment 3 | Pigment 5 | Pigment 6 | Pigment 6 | Pigment 1 | Pigment 1 | Pigment 5 |
| | Content (on solid basis) | 10 | 10 | 10 | 10 | 10 | 15 | 5 | 10 |
| Polymer particles | Type | Polymer 1 | Polymer 1 | Polymer 1 | Polymer 1 | — | Polymer 1 | Polymer 1 | — |
| | Content (on solid basis) | 5 | 5 | 5 | 5 | — | 5 | 5 | — |
| Surfactant | SURFYNOL DF110D | 0.3 | 0.3 | 0.3 | 0.3 | 0.3 | 0.3 | 0.3 | 0.3 |
| | BYK-348 | 0.4 | 0.4 | 0.4 | 0.4 | 0.4 | 0.4 | 0.4 | 0.4 |
| pH-adjusting agent | Tripropanolamine | 0.1 | 0.1 | 0.1 | 0.1 | 0.1 | 0.1 | 0.1 | 0.1 |
| Solvent | Propylene glycol | 10 | 10 | 10 | 10 | 10 | 10 | 10 | 10 |
| | 1,2-Hexanediol | 1 | 1 | 1 | 1 | 1 | 1 | 1 | 1 |
| | Water | Balance | Balance | Balance | Balance | Balance | Balance | Balance | Balance |
| | $D_1/D_2$ | 1.36 | 0.96 | 1.50 | 0.50 | — | 1.44 | 1.44 | — |
| | Absorbance of ink | 1.669 | 1.449 | 1.732 | — | — | — | — | 1.691 |
| Evaluation results | Ejection stability | A | B | B | A | A | B | A | B |
| | Shield capability | B | B | A | C | C | A | B | B |
| | Degree of whiteness | B | A | A | — | — | A | B | B |
| | Precipitation properties | B | B | C | A | A | B | B | C |

In Tables 3 and 4, the item "Absorbance of ink" refers to the absorbance (wavelength: 500 nm) of the ink composition when the ink composition was diluted with water so that the solid content of the pigment component was 0.01 mass %.

2.4. Evaluation Tests 2.4.1. Ejection Stability

The ink composition obtained as described above was provided to an inkjet printer ("PX-G930" manufactured by Seiko Epson Corporation). An image was formed on a recording medium using the ink composition. The inkjet printer was allowed to stand at 40° C. for 14 days in a state in which the ejection head of the inkjet printer was capped, and the recovery capability through cleaning was evaluated in accordance with the following criteria.

A: The cleaning operation was required once for recovery, or no cleaning operation was required for recovery.
B: The cleaning operation was required two or three times for recovery.
C: The cleaning operation was required four to ten times for recovery.
D: Recovery could not be achieved by cleaning.

2.4.2. Degree of Whiteness

The ink composition obtained as described above was provided to an inkjet printer ("PX-G930" manufactured by Seiko Epson Corporation). An image was formed on a film ("Clear Proof film" manufactured by Seiko Epson Corporation, size: A4) using the ink composition. A solid pattern was formed at a resolution of 1,440×1,440 dpi (duty: 100%).

The degree of whiteness ($L^*$) of the resulting image was measured using a spectrophotometer "Gretag Macbeth Spectrolino" (manufactured by X-RITE). A black mount having an OD value of 2.1 was used as a base during the measurement. The degree of whiteness was evaluated in accordance with the following criteria.

A: The $L^*$ value was 75 or more.
B: The $L^*$ value was 70 or more and less than 75.
C: The $L^*$ value was 60 or more and less than 70.
D: The $L^*$ value was less than 60.

2.4.3. Shield Capability

The ink composition obtained as described above was provided to an inkjet printer ("PX-G930" manufactured by Seiko Epson Corporation). An image was formed on a film ("Clear Proof film" manufactured by Seiko Epson Corporation, size: A4) using the ink composition. A solid pattern was formed at a resolution of 1,440×1,440 dpi (duty: 100%).

Light (wavelength: 380 to 800 nm) that passed through the image was integrated using a multi-angle colorimeter ("ARM-500V" manufactured by JASCO Corporation). The shield capability was evaluated in accordance with the following criteria.

A: Less than 500
B: 500 or more and less than 1,000
C: 1,000 or more and less than 2,500
D: 2,500 or more 2.4.4. Precipitation Properties The ink composition obtained as described above was put in a 10 mL graduated cylinder, and allowed to stand for 1 week in a temperature-controlled room (20° C.). 2 mL of the supernatant liquid was sampled, and the absorbance WA (wavelength: 500 nm) of the supernatant liquid at a wavelength of 500 nm, and the absorbance W0 (wavelength: 500 nm) of the ink composition (before being allowed to stand for 1 week) were measured. The residual ratio S was calculated using the following expression.

$$\text{Residual ratio } S (\%) = ((\text{absorbance } \mathit{WA})/(\text{absorbance } \mathit{W0})) \times 100$$

The precipitation properties were evaluated based on the calculated residual ratio S (%) in accordance with the following criteria.

A: The residual ratio S was 80% or more.
B: The residual ratio S was 50% or more and less than 80%.
C: The residual ratio S was 20% or more and less than 50%.
D: The residual ratio S was less than 20%.

2.5. Evaluation Results

The results of the above evaluation tests are listed in Tables 3 and 4.

As is clear from the results listed in Tables 3 and 4, the ink compositions according to the invention had excellent ejection stability, and the shield capability and the color development capability of the white image were improved when the ink compositions were caused to adhere to the recording medium. When porous titanium dioxide was used as the white coloring material, precipitation did not occur in the ink composition, and excellent storage stability was achieved.

Figure 2:
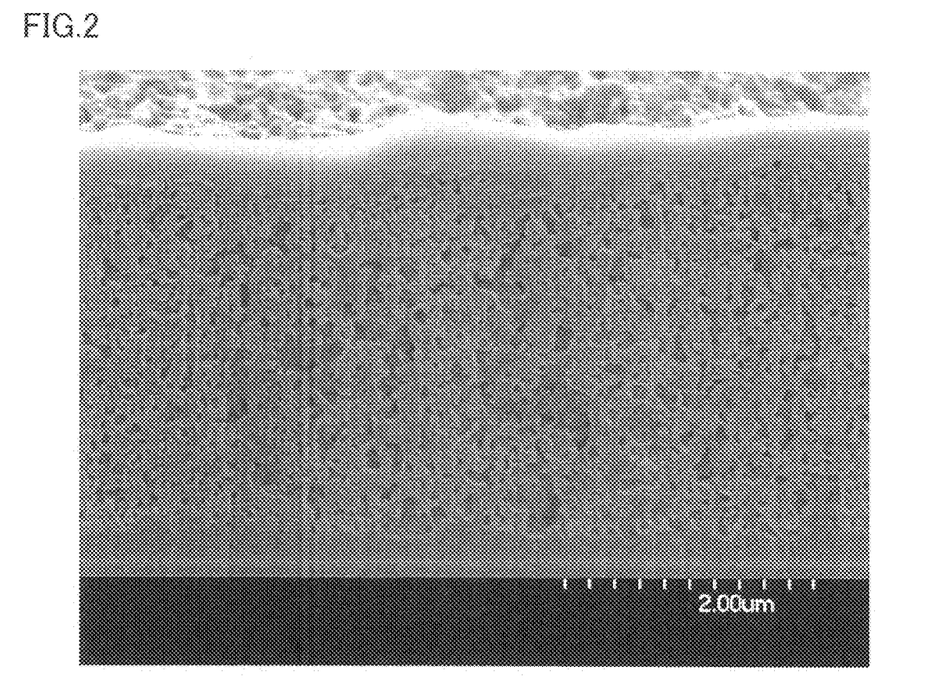
FIG. 2 illustrates an SEM image of the cross section of the image recorded using the ink 1.
Figure 3:
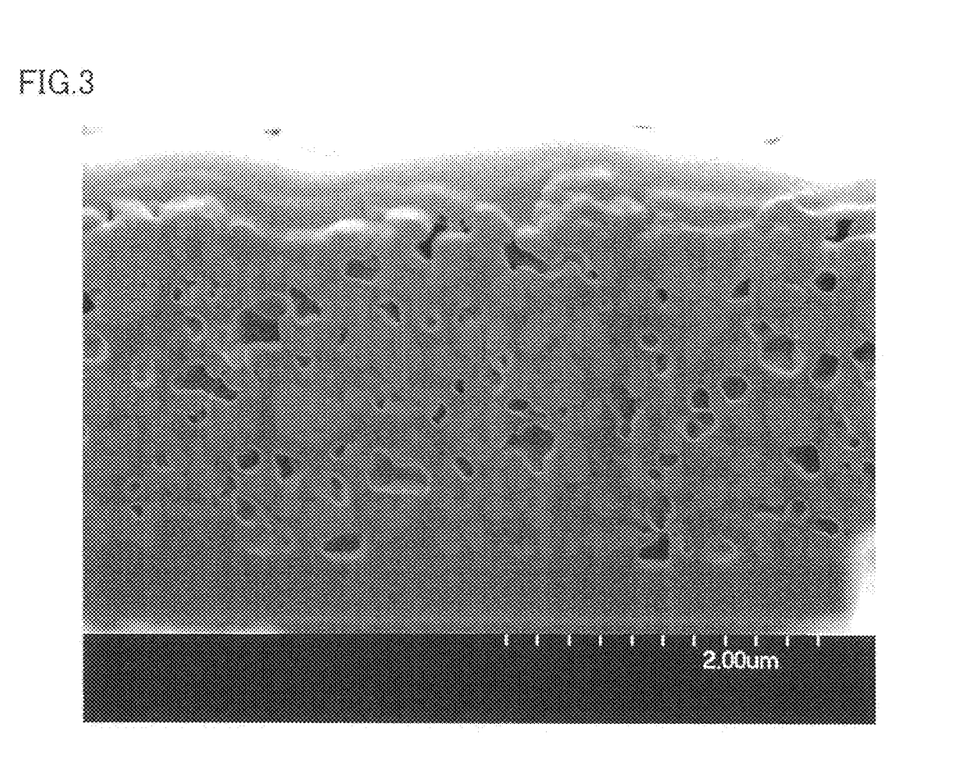
FIG. 3 illustrates an SEM image of the cross section of the image recorded using the ink 5.

The state of the cross section of the images recorded using the inks 1 and 5 (when evaluating the degree of whiteness) was observed using an SEM.

FIG. 2 illustrates an SEM image of the cross section of the image recorded using the ink 1. FIG. 3 illustrates an SEM image of the cross section of the image recorded using the ink 5.

As illustrated in FIG. 2, a number of fine voids are formed in the image recorded using the ink composition according to the invention. It is considered that the void layer increases the scattering of light, so that the shield capability and the color development capability of the white image are improved.

As illustrated in FIG. 3, only a small number of voids are formed (i.e., a dense layer is formed) in the image recorded using the ink composition that corresponds to a comparative example. It is considered that such a dense layer decreases the scattering of light, whereby the shield capability and the color development capability of the white image are insufficient.

The invention is not limited to the above embodiments. Various modifications and variations may be made of the above embodiments. For example, the invention includes various other configurations substantially the same as the configurations described in connection with the above embodiments (e.g., a configuration having the same function, method, and results, or a configuration having the same objective and results). The invention also includes a configuration in which an unsubstantial element described in connection with the above embodiments is replaced by another element. The invention also includes a configuration having the same effects as those of the configurations described in connection with the above embodiments, or a configuration capable of achieving the same objective as that of the configurations described in connection with the above embodiments. The invention further includes a configuration in which a known technique is added to the configurations described in connection with the above embodiments.

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention.

What is claimed is:

1. An ink composition comprising a white coloring material, polymer particles, and a solvent,
the polymer particles comprising a repeating unit derived from an unsaturated vinyl monomer and a repeating unit derived from a monomer that includes two or more polymerizable double bonds,
an average particle size of the polymer particles being 50 to 1,000 nm, and a melting start temperature being 20 to 65° C.,
the polymer particles satisfying a relationship represented by an expression (1), $$Y \leq 0.33X + 20 \quad (1)$$

where X is an average particle size D50 (nm) and Y is a melting start temperature (° C.).

2. The ink composition as defined in claim 1, the polymer particles comprising the repeating unit derived from the monomer that includes two or more polymerizable double bonds in a ratio of 1 to 10 parts by mass based on 100 parts by mass of the polymer particles.

3. The ink composition as defined in claim 1, the polymer particles having a solubility in toluene of 10 to 80 mass %.

4. The ink composition as defined in claim 1, the average particle size D50 of the polymer particles being 50 to 500 nm.

5. The ink composition as defined in claim 1, the ink composition having an absorbance (wavelength: 500 nm) of 1.1 to 2.2 when the ink composition is diluted with water so that a solid content of the white coloring material is 0.01 mass %.

6. The ink composition as defined in claim 1, the average particle size D50 of the white coloring material and the average particle size D50 of the polymer particles satisfying a relationship "D1:D2=1:0.01 to 1:5", where D1 (nm) is the average particle size D50 of the white coloring material, and D2 (nm) is the average particle size D50 of the polymer particles.

7. The ink composition as defined in claim 6, D1 being 100 to 800 nm, and D2 being 100 to 500 nm.

8. The ink composition as defined in claim 1, the content of the white coloring material and the content of the polymer particles satisfying a relationship "W1:W2=1:5 to 5:1", where W1 is the content of the white coloring material, and W2 is the content of the polymer particles.

9. The ink composition as defined in claim 1, the white coloring material being aggregates of particles having a primary particle size of 10 to 200 nm.

* * * * *